US010381007B2

(12) United States Patent
Liu et al.

(10) Patent No.: US 10,381,007 B2
(45) Date of Patent: *Aug. 13, 2019

(54) LOW POWER INTEGRATED CIRCUIT TO ANALYZE A DIGITIZED AUDIO STREAM

(71) Applicant: QUALCOMM Incorporated, San Diego, CA (US)

(72) Inventors: Eric Liu, Redwood City, CA (US); Stefan Johannes Walter Marti, Oakland, CA (US); Seung Wook Kim, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/400,817

(22) Filed: Jan. 6, 2017

(65) Prior Publication Data

US 2017/0116992 A1    Apr. 27, 2017

Related U.S. Application Data

(63) Continuation of application No. 14/363,783, filed as application No. PCT/US2011/063804 on Dec. 7, 2011, now Pat. No. 9,564,131.

(51) Int. Cl.
*G10L 15/00* (2013.01)
*G10L 15/26* (2006.01)
(Continued)

(52) U.S. Cl.
CPC ............ *G10L 15/26* (2013.01); *G06F 1/3206* (2013.01); *G06F 1/3293* (2013.01);
(Continued)

(58) Field of Classification Search
CPC ......... G10L 15/00; G10L 15/22; G10L 15/26; G10L 15/30
(Continued)

(56) References Cited

U.S. PATENT DOCUMENTS

| 5,278,944 A | 1/1994 | Sasaki et al. |
| 5,721,938 A | 2/1998 | Stuckey |

(Continued)

FOREIGN PATENT DOCUMENTS

| CN | 1564256 A | 1/2005 |
| CN | 101076099 A | 11/2007 |

(Continued)

OTHER PUBLICATIONS

Boucheron L.E., et al., "Hybrid Scalar/Vector Quantization of Mel-Frequency Cepstral Coefficients for Low Bit-Rate Coding of Speech," IEEE Data Compression Conference (DCC), Mar. 2011, pp. 103-112.

(Continued)

*Primary Examiner* — Daniel Abebe
(74) *Attorney, Agent, or Firm* — Polsinelli

(57) ABSTRACT

Methods, devices, and systems for processing audio information are disclosed. An exemplary method includes receiving an audio stream. The audio stream may be monitored by a low power integrated circuit. The audio stream may be digitized by the low power integrated circuit. The digitized audio stream may be stored in a memory, wherein storing the digitized audio stream comprises replacing a prior digitized audio stream stored in the memory with the digitized audio stream. The low power integrated circuit may analyze the stored digitized audio stream for recognition of a keyword. The low power integrated circuit may induce a processor to enter an increased power usage state upon recognition of the keyword within the stored digitized audio stream. The stored digitized audio stream may be transmitted to a server for processing. A response received from the server based on the processed audio stream may be rendered.

27 Claims, 5 Drawing Sheets

(51) Int. Cl.
  *G06F 1/3206* (2019.01)
  *G06F 1/3293* (2019.01)
  *G10L 15/18* (2013.01)
  *G10L 15/22* (2006.01)
  *G10L 15/28* (2013.01)
  *G10L 15/08* (2006.01)

(52) U.S. Cl.
  CPC .......... *G10L 15/1822* (2013.01); *G10L 15/22* (2013.01); *G10L 15/285* (2013.01); *G10L 2015/088* (2013.01); *Y02D 10/122* (2018.01)

(58) Field of Classification Search
  USPC ........................................................ 704/275
  See application file for complete search history.

(56) References Cited

U.S. PATENT DOCUMENTS

| | | | |
|---|---|---|---|
| 5,946,050 A * | 8/1999 | Wolff | G10L 15/04 |
| | | | 348/462 |
| 5,983,186 A | 11/1999 | Miyazawa et al. | |
| 6,070,140 A | 5/2000 | Tran | |
| 6,101,473 A * | 8/2000 | Scott | H04M 3/493 |
| | | | 704/275 |
| 6,253,176 B1 | 6/2001 | Janek et al. | |
| 6,408,272 B1 * | 6/2002 | White | G10L 15/30 |
| | | | 704/270.1 |
| 6,594,630 B1 | 7/2003 | Zlokarnik et al. | |
| 6,718,307 B1 | 4/2004 | Buil et al. | |
| 7,567,827 B2 | 7/2009 | Kim | |
| 7,774,626 B2 | 8/2010 | Fleming | |
| 7,818,176 B2 | 10/2010 | Freeman et al. | |
| 8,078,469 B2 * | 12/2011 | White | G10L 15/30 |
| | | | 704/270 |
| 8,108,218 B1 | 1/2012 | Huboi | |
| 8,150,700 B2 | 4/2012 | Shin et al. | |
| 8,160,884 B2 | 4/2012 | Roth et al. | |
| 8,266,451 B2 | 9/2012 | Leydier et al. | |
| 8,359,020 B2 | 1/2013 | Lebeau et al. | |
| 8,606,293 B2 | 12/2013 | Kim et al. | |
| 8,666,751 B2 | 3/2014 | Murthi et al. | |
| 8,682,667 B2 | 3/2014 | Haughay | |
| 8,798,995 B1 | 8/2014 | Edara | |
| 8,880,405 B2 | 11/2014 | Cerra et al. | |
| 8,924,219 B1 | 12/2014 | Bringert et al. | |
| 9,031,847 B2 | 5/2015 | Sarin et al. | |
| 9,112,989 B2 | 8/2015 | Lee et al. | |
| 9,444,939 B2 | 9/2016 | Ryan et al. | |
| 9,564,131 B2 | 2/2017 | Liu et al. | |
| 2002/0046033 A1 | 4/2002 | Ono et al. | |
| 2002/0077830 A1 | 6/2002 | Suomela et al. | |
| 2003/0193964 A1 | 10/2003 | Bae et al. | |
| 2004/0002862 A1 | 1/2004 | Kim et al. | |
| 2004/0054532 A1 | 3/2004 | Staiger | |
| 2005/0091052 A1 | 4/2005 | Chang et al. | |
| 2005/0114132 A1 | 5/2005 | Hsu et al. | |
| 2006/0074658 A1 | 4/2006 | Chadha | |
| 2007/0192109 A1 | 8/2007 | Likens et al. | |
| 2007/0254680 A1 | 11/2007 | Nassimi | |
| 2008/0168189 A1 | 7/2008 | Aldaz et al. | |
| 2008/0221891 A1 | 9/2008 | Konig et al. | |
| 2009/0055005 A1 | 2/2009 | Oxman et al. | |
| 2009/0070119 A1 | 3/2009 | Yoo et al. | |
| 2009/0209300 A1 | 8/2009 | Furbeck | |
| 2009/0234655 A1 | 9/2009 | Kwon | |
| 2009/0271190 A1 | 10/2009 | Niemisto et al. | |
| 2011/0066431 A1 | 3/2011 | Ju et al. | |
| 2011/0245946 A1 | 10/2011 | Kim et al. | |
| 2011/0246206 A1 | 10/2011 | Kim et al. | |
| 2012/0010890 A1 * | 1/2012 | Koverzin | H04W 52/0254 |
| | | | 704/275 |
| 2012/0224706 A1 | 9/2012 | Hwang et al. | |
| 2013/0054243 A1 | 2/2013 | Ichikawa | |
| 2013/0110521 A1 | 5/2013 | Hwang et al. | |
| 2014/0214429 A1 * | 7/2014 | Pantel | G10L 21/16 |
| | | | 704/275 |
| 2018/0197533 A1 * | 7/2018 | Lyon | G10L 15/16 |

FOREIGN PATENT DOCUMENTS

| | | |
|---|---|---|
| CN | 101083809 A | 12/2007 |
| CN | 101164102 A | 4/2008 |
| CN | 101483683 A | 7/2009 |
| CN | 101938391 A | 1/2011 |
| CN | 101968791 A | 2/2011 |
| CN | 101971250 A | 2/2011 |
| CN | 201752079 U | 2/2011 |
| CN | 102023705 A | 4/2011 |
| CN | 102118886 A | 7/2011 |
| EP | 1879000 A1 | 1/2008 |
| EP | 1978765 A1 | 10/2008 |
| GB | 2342828 A | 4/2000 |
| JP | H07121195 A | 5/1995 |
| JP | H07244494 A | 9/1995 |
| JP | H10312194 A | 11/1998 |
| JP | 2000315097 A | 11/2000 |
| JP | 2003505712 A | 2/2003 |
| JP | 2004226698 A | 8/2004 |
| JP | 2004265217 A | 9/2004 |
| JP | 2004294946 A | 10/2004 |
| JP | 2005070367 A | 3/2005 |
| JP | 2007219207 A | 8/2007 |
| JP | 2007255897 A | 10/2007 |
| JP | 2008309864 A | 12/2008 |
| JP | 2009265219 A | 11/2009 |
| JP | 2010268324 A | 11/2010 |
| KR | 20010063844 A | 7/2001 |
| KR | 20030081835 A | 10/2003 |
| KR | 100447667 B1 | 9/2004 |
| KR | 100744301 B1 | 7/2007 |
| WO | 2004084443 A1 | 9/2004 |
| WO | 2008004037 A1 | 1/2008 |
| WO | 2010078386 A1 | 7/2010 |
| WO | 2011037264 A1 | 3/2011 |
| WO | 2011059781 A1 | 5/2011 |

OTHER PUBLICATIONS

Delaney B., et al., "Energy Aware Distributed Speech Recognition for Wireless Mobile Devices", Copyright Hewlett-Packard Company 2004, HP Laboratories Palo Alto HPL-2004-106, Jun. 17, 2004.
International Search Report and Written Opinion—PCT/US2011/063804—ISA/EPO—dated Aug. 29, 2012.
Supplementary European Search Report—EP11877053—Search Authority—Munich—dated Sep. 30, 2015.
Alon G., "Key-Word Spotting The Base Technology for Speech Analytics," White Paper, Natural Speech communication Ltd., Jul. 2005, 8 pages.
Bourke P.J., "A Low-Power Hardware Architecture for Speech Recognition Search," Carnegie Mellon University, Pittsburgh, PA, May 2011, 166 pages.
Ceron I.F.C., et al., "A Keyword Based Interactive Speech Recognition System for Embedded Applications," School of Innovation, Design and Engineering, Malardalen University, Vasteras, Sweden, Jun. 2011, 96 pages.
State Intellectual Property Office of the People's Republic of China Notification of Examination Decision for Invalidation Request, Application/Patent No. 201180076332.2; Case No. 4W107002, Oct. 9, 2018, 44 Pages.
State Intellectual Property Office of the People's Republic of China Notification of Examination Decision for Invalidation Request, Application/Patent No. 201180076332.2; Case No. 4W107724, Feb. 2, 2019, 29 pages.
English translation of Appeal against the Final Rejection on Korean Patent Application No. 10-2014-7018606, dated Apr. 18, 2019, 14 Pages.

(56) References Cited

OTHER PUBLICATIONS

Korean Office Action dated Apr. 18, 2019 for Korean Patent Application Serial No. 10-2014-7018606, 29 Pages.

* cited by examiner

LOW POWER INTEGRATED CIRCUIT TO ANALYZE A DIGITIZED AUDIO STREAM

CROSS-REFERENCE TO RELATED APPLICATIONS

The present application is a continuation of U.S. patent application Ser. No. 14/363,783, filed on Oct. 21, 2014, entitled "LOW POWER INTEGRATED CIRCUIT TO ANALYZE A DIGITIZED AUDIO STREAM", which is a U.S. National Phase Application of PCT/US2011/063804, filed Dec. 7, 2011, entitled "LOW POWER INTEGRATED CIRCUIT TO ANALYZE A DIGITIZED AUDIO STREAM", both of which are incorporated herein by reference in their entirety.

BACKGROUND OF THE INVENTION

Computing devices have gained in sophistication to users by processing audio instructions and providing responses. Users can recite audio instructions which may be used to control these computing devices. For example, users can speak to the computing devices to provide information, such as instructions to provide directions to a particular location.

BRIEF DESCRIPTION OF THE DRAWINGS

In the accompanying drawings, like numerals refer to like components or blocks. The following detailed description references the drawings, wherein.

DETAILED DESCRIPTION OF THE INVENTION

Figure 1:
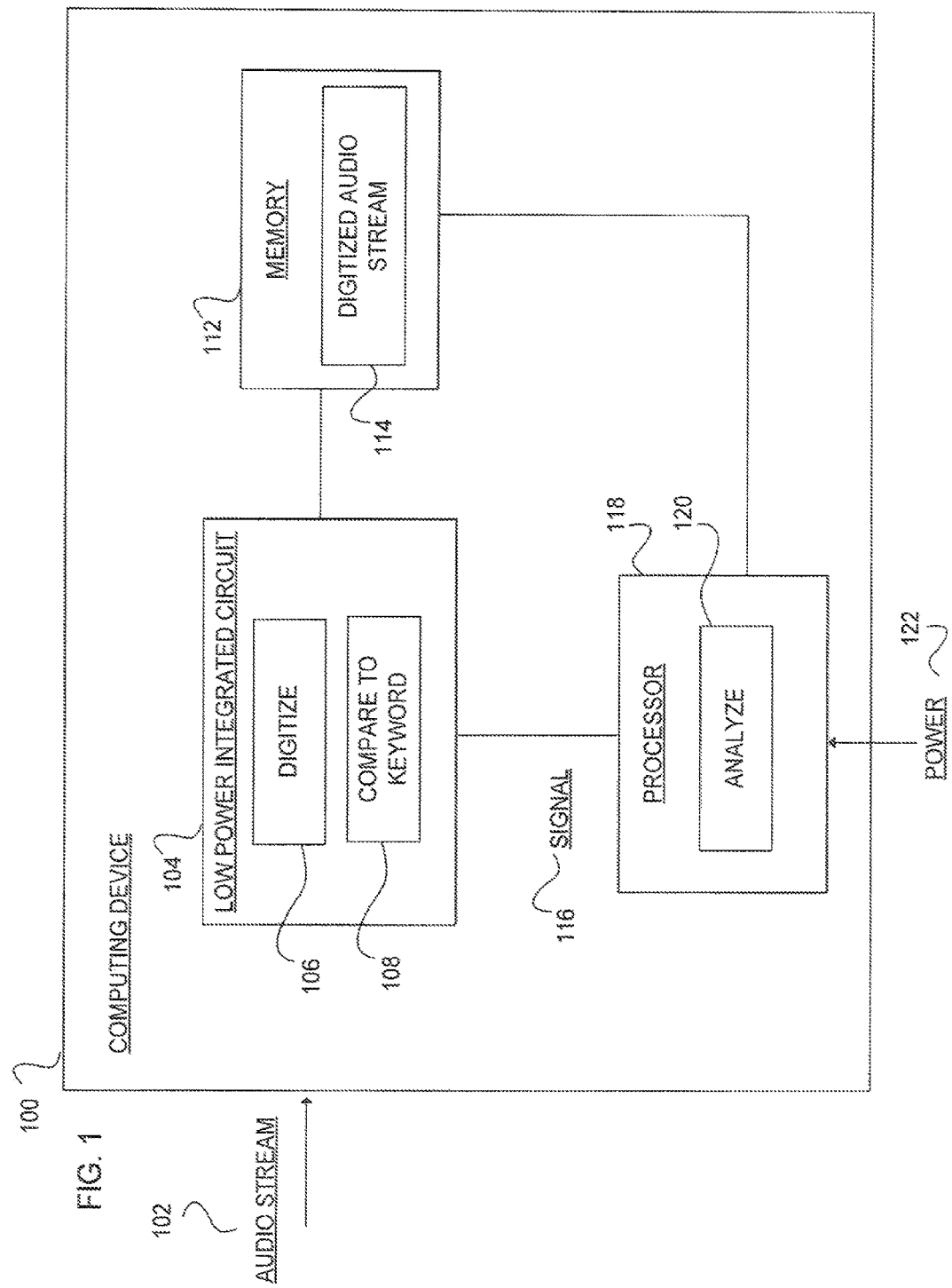
FIG. 1 is a block diagram of an example computing device including a low power integrated circuit to analyze an audio stream and a processor to analyze a digitized audio stream in response to detection of a keyword by the integrated circuit.

In audio information processing, a user typically activates the application to process audio by pressing a button and/or reciting instructions. Once launching the audio processing application, the user additionally needs to recite explicit instructions they would desire a computing device to perform. Thus, processing speech instructions from a user can be time consuming and repetitive. In addition, continuously monitoring for instructions from the user consumes much power, draining the battery.

To address these issues, example embodiments disclosed herein use a low power integrated circuit to continuously monitor for occurrence of a keyword in an audio stream (e.g., the user's speech), while relying on a processor for more thorough analysis of the user's speech. For example, various examples disclosed herein provide for receiving an audio stream in a low power integrated circuit, digitizing the audio stream, and analyzing the digitized audio stream to recognize a keyword. Once recognizing the keyword within the digitized audio stream, the integrated circuit sends a signal to the processor to increase power. Once increasing power to the processor, the digitized audio stream is retrieved to determine a response. This decreases the amount of time consumed for the user to launch the specific audio processing application and prevents repetition of the user's speech. Determining the response from the retrieved audio stream prevents the user from providing additional explicit instructions for the computing device to perform the speech analysis.

Additionally, in the various examples disclosed herein, once increasing power to the processor, the processor retrieves the digitized audio stream from a memory and converts the digitized audio stream to a text stream. After converting to the text stream, the processor determines a response based on text within the text stream. Determining the response from the text stream reduces the time for the user of the computing device to instruct the computing device. Additionally still, the processor may determine the appropriate response, based on the context of the audio stream. Further, the computing device determines which application needs to execute in order to fulfill the response to the user. Further still, by increasing power to the processor once recognizing the keyword within the digitized audio stream, the computing device consumes less power while listening for the user's speech.

In one embodiment, the computing device may also determine the response by receiving the response from a server or from the processor. In a further embodiment, the memory maintains the stored digitized audio stream for a predetermined period of time. In this embodiment, the processor can retrieve the digitized audio stream in time increments. For example, the processor may retrieve the complete digitized audio stream or may retrieve a shorter time interval of the digitized audio stream. The retrieval of the digitized audio stream allows the processor to analyze the context of the audio stream to determine the appropriate response.

In this manner, example embodiments disclosed herein save a user time by preventing repetitive audio instructions to a computing device since the computing device determines an appropriate response based on the context of the audio stream. Further, the computing device consumes less power while receiving and processing audio streams.

Referring now to the drawings, FIG. 1 is a block diagram of an example computing device 100 including a low power integrated circuit 104 for receiving an audio stream 102 and a digitize module 106 to digitize the audio stream to provide the digitized audio stream 114 to a memory 112. Further, the low power integrated circuit 104 includes a compare to keyword module 108 to compare the digitized audio stream 114 to a keyword and, based on the recognition of the keyword, transmit a signal 116 to a processor 118 to increase power 122. Further, still, the processor includes an analyze module 120 to analyze the digitized audio stream 114. Embodiments of the computing device 100 include a client device, personal computer, desktop computer, laptop, a mobile device, or other computing device suitable to include components 04, 112, and 118.

The audio stream 102 is received by the computing device 100, specifically, the low power integrated circuit 104. The audio stream 102 is an input analog signal that is digitized 106 to provide the digitized audio stream 114. Embodiments of the audio stream 102 include speech from a user or audio from another computing device. For example, there may be several computing devices 300 receiving audio streams 102, which may be confusing. Thus, the computing devices may designate one device as a central point to receive the audio stream 102. In this embodiment, the low power integrated circuit 104 operates as part of an ad-hoc network that may be a central unit of one or more computing devices.

For example, the user may discuss with another person the shortest route from New York to Los Angeles, Calif. In this example, the audio stream would be the discussion of the shortest route from New York to Los Angeles. In a further embodiment, the audio stream 102 may include audio for a predetermined period of time. For example, the audio stream 102 may include a few seconds or minutes when received by the low power integrated circuit 104. In this example, the low power integrated circuit 104 may distinguish the audio stream 102 from other audio streams 102.

The low power integrated circuit 104 includes the module 106 to digitize the audio stream 102 and module 108 to compare the digitized audio stream 114 to the keyword. The low power integrated circuit 104 is an electronic circuit with patterned trace elements on the surface of a material that form interconnections between other electronic components. For example, the low power integrated circuit 104 forms connections between the processor 118 and the memory 112. Embodiments of the low power integrated circuit 104 include a microchip, chipset, electronic circuit, chip, microprocessor, semiconductor, microcontroller, or other electronic circuit capable of receiving audio stream 102 and transmitting signal 116. The low power integrated circuit 104 may continuously monitor the audio stream 102, utilize digitize module 106 to digitize the audio stream, and store the digitized audio stream at the memory 112. As such, further embodiments of the low power integrated circuit 104 include a transmitter, receiver, microphone, or other suitable component to receive the audio stream 102.

The audio stream is digitized at module 106 to provide the digitized audio stream 114. The digitize module 106 converts the audio stream to a discrete time signal representation. Embodiments of the digitize module 106 include an analog to digital converter (ADC), digital conversion device, instruction, firmware and/or software operating in conjunction with low power integrated circuit 104. For example, the digitize module 106 may include an electronic device to convert an input analog voltage to a digital number proportional to the magnitude of the analog signal.

Once the audio stream 102 is digitized at module 106, it is compared to the keyword at module 108. The audio stream 102 and at module 108, it is compared against the keyword which operates as an indication to signal 116 the processor 118 to increase power 122 and obtain the digitized audio stream 114 to analyze at module 120. Embodiments of 108 include an instruction, process, operation, logic, algorithm, technique, logical function, firmware and/or software. Once the keyword is recognized, the low power integrated circuit 104 transmits the signal 116 to increase power 122 to the processor 118.

Embodiments of the keyword include a digital signal, analog signal, pattern, database, commands, directions, instructions, or other representation to compare at module 108. For example, the user of a computing device may discuss the difference between a shrimp and prawn with a friend and subsequently desire to perform a web search to identify the answer. As such, the user may state the predetermined keyword to trigger recognition of the keyword by compare to keyword module 108 and subsequent analysis of the previous discussion by analyze module 120.

The keyword may include, for example, a phrase, a single keyword, or a single keyword that is private to the user of the computing device. In keeping with the previous example, the keyword may be the phrase, "Computer, what do you think?". In this example, the phrase causes the low power integrated circuit 104 to send the signal 116 to the processor 118 to obtain the digitized audio stream 114 which may include the audio before or after the phrase. Thus, the user does not need to repeat the instructions since the processor 118 analyzes the digitized audio stream 114 to determine the context of the audio stream 102 for an appropriate response. Yet, in a further example, the single keyword, may include "Shazam." Thus, as a specific example, when the user speaks the word "Shazam," circuit 104 may detect the keyword and transmit the signal 116 to instruct the processor 118 to obtain the digitized audio stream 114 and convert the stream to a text stream. Supposing the text stream is an instruction to compose a text message to the user's mother, the appropriate response would be to compose the text message. Thus, as described above, using the predetermined keyword(s), the low power integrated circuit 104 recognizes when the user of the computing device needs to complete a further response, such as directions or perform a web search.

In a further embodiment of module 108, when no keyword is recognized within the digitized audio stream 114, the low power integrated circuit 104 continues monitoring for another audio stream 102 which is digitized at module 106 and stored in the memory 112. In yet a further embodiment, the low power integrated circuit 104 compresses the digitized audio stream 114 and this compressed digitized audio stream is used to recognize the keyword by comparing it to the keyword at module 108.

The memory 112 stores and/or maintains the digitized audio stream 114. Embodiments of the memory 112 may include a memory buffer, cache, non-volatile memory, volatile memory, random access memory (RAM), an Electrically Erasable Programmable Read-Only Memory (EEPROM), storage drive, a Compact Disc Read-Only Memory (CD-DROM), or other memory capable of storing and/or maintaining the digitized audio stream 114.

The digitized audio stream 114 is stored in the memory 112. Embodiments may include the low power integrated circuit 104 compressing the audio stream 102 after the digitization module 106 to obtain a compressed digitized audio stream prior to placement in the memory 112. Although FIG. 1 depicts the digitized audio stream 114 stored in the memory 112, the digitized audio stream may also be stored in a memory on the low power integrated circuit 104. In a further embodiment, digitized audio stream 114 includes a predetermined amount of time of an audio stream 102. In this embodiment, once the audio stream 102 is received for a predetermined period of time, such as a few seconds or minutes, this predetermined period of time of the audio stream 102 is digitized and stored in the memory 112 for the processor 118 to obtain and/or retrieve. Further in this embodiment, when another audio stream 102 is received by the low power integrated circuit 104 and digitized, the prior digitized audio stream in the memory is replaced with the more current digitized audio stream 114. Thus, the processor 118 obtains and/or retrieves the most current audio stream 102. In this embodiment, the memory operates as a first-in-first-out buffer to provide the most current audio stream 102.

The signal 116 is transmitted from the low power integrated circuit 104 to the processor 118 upon recognition of the keyword within the digitized audio stream 114. The signal 116 instructs the processor 118 to increase power 122 and analyze the digitized audio stream 114 from the memory 12. Embodiments of the signal 116 include a communication, transmission, electrical signal, instruction, digital signal, analog signal, or other type of communication to increase power 122 to the processor 118. A further embodiment of the signal 116 includes an interrupt transmitted to the processor 118 upon recognition of the keyword within the digitized audio stream 114.

The processor 118 receives the signal 116 to increase power 122 and obtains the digitized audio stream 114 to analyze at module 120. Embodiments of the processor 118 may include a central processing unit (CPU), visual processing unit (VPU), microprocessor, graphics processing unit (GPU), or other programmable device suitable to analyze 120 the digitized audio stream 14.

Once the processor 118 obtains the digitized audio stream 114 from the memory 112, the processor analyzes the digitized audio stream 114 at module 120. Embodiments of the analyze module 120 include an instruction, process, operation, logic, algorithm, technique, logical function, firmware and/or software the processor 18 may fetch, decode, and/or execute. Additional embodiments of module 120 include converting the digitized audio stream 114 to a text stream to determine an appropriate response based on the context of the audio stream 102. Further embodiments of module 120 include determining a response to render to the user of the computing device 100 as will be seen in later figures.

The power 122 supplies electrical energy in the form of electrical potential to the processor 118. Specifically, the power 122 increases electrical energy to the processor 118 once receiving the signal 116 from the low power integrated circuit 104. Increasing the power 122 to the processor 118 wakes or triggers the processor 118 to obtain the digitized audio stream 114. Embodiments of the power 122 include a power supply, power management device, battery, energy storage, electromechanical system, solar power, power plug, or other device capable of delivering power 122 to the processor 118. In a further embodiment, power 122 supplies the electrical energy to the computing device 100.

Figure 2:
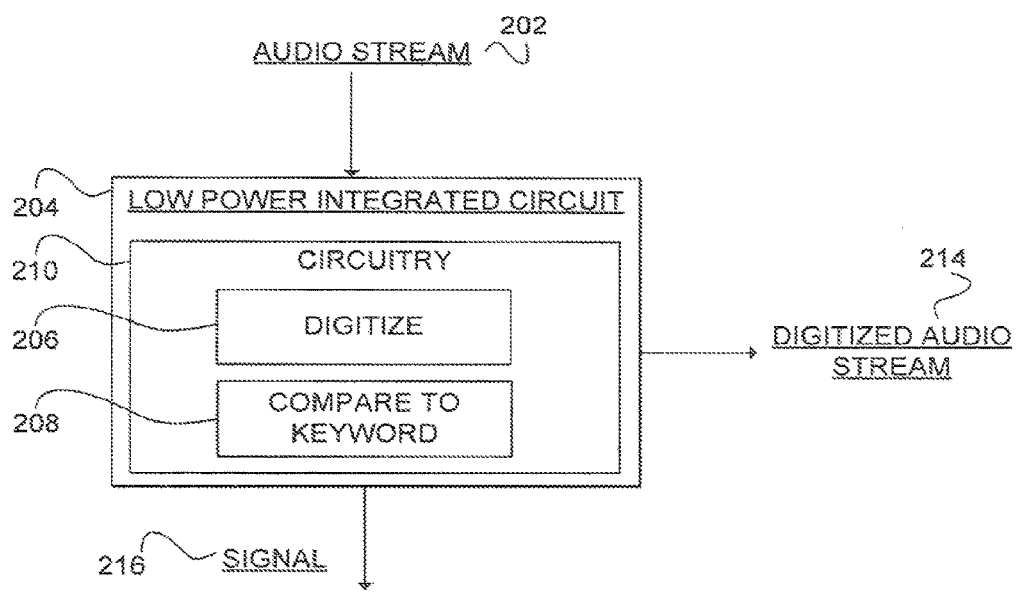
FIG. 2 is a block diagram of an example low power integrated circuit for analyzing an audio stream and transmitting a signal to a processor to increase power when a keyword is detected in the audio stream.

Referring now to FIG. 2, is a block diagram of an example low power integrated circuit 204 for analyzing an audio stream 202 and transmitting a signal 216 to a processor to increase power when a keyword is detected in the audio stream 202. The low power integrated circuit 204 includes circuitry 210 to produce a digitized audio stream 214 using a digitize circuitry 206 and detects the keyword by a compare circuitry 208, and upon recognition of the keyword in the digitized audio stream 214, transmits a signal 216.

The audio stream 202 is received by the low power integrated circuit 204. The audio stream 202 may be similar in structure to audio stream 102 of FIG. 1.

The low power integrated circuit 204 includes the circuitry 210 to digitize the audio stream 202 and compare the digitized audio stream 214 to a keyword. The low power integrated circuit 204 may be similar in functionality and structure of the low power integrated circuit 104 as above in FIG. 1.

The circuitry 210 includes digitize circuitry 206 and compare circuitry 208. Embodiments of the circuitry 210 include logic, analog circuitry, electronic circuitry, digital circuitry, or other circuitry capable of digitizing the audio stream 102 and comparing the digitized audio stream 214 to the keyword. In further embodiments, the circuitry includes an application and/or firmware which may be utilized independently and/or in conjunction with the low power integrated circuit 204 to fetch, decode, and or execute circuitry 206 and 208.

The audio stream 202 is received and digitized by circuitry 206 to produce the digitized audio stream 214. The digitize circuitry 206 is a type of conversion for the audio stream 202. Further, the digitize circuitry 206 may be similar in functionality of the digitize module 106 as described in connection with FIG. 1.

The low power integrated circuit 204 receives the audio stream 202 to digitize at circuitry 206 and produces the digitized audio stream 214. The digitized audio stream 214 may be similar in structure to the digitized audio stream 114 as described in connection with FIG. 1. Further, although FIG. 2 depicts the digitized audio stream 214 outside of the low power integrated circuit 204, the digitized audio stream 214 may also be located within the low power integrated circuit 204. The digitized audio stream 214 located within the low power integrated circuit 204 is used at circuitry 208 to compare to a keyword. In another embodiment, the digitized audio stream 214 is stored and/or maintained in a memory.

The circuitry 208 included in the circuitry 210 of the low power integrated circuit 204, compares the digitized audio stream 214 to the keyword. Further, 208 is used to recognize the keyword within the digitized audio stream 214 to transmit the signal 216 to increase power to the processor. The compare circuitry 208 may be similar in functionality to the module 108 as described in connection with FIG. 1.

The signal 216 instructs a device to increase power upon recognition of the keyword within the digitized audio stream 214 by compare circuitry 208. The signal 216 may be similar in structure and functionality to signal 116 of FIG. 1. An embodiment of the signal 216 includes instructing a processor to increase power and analyze the digitized audio stream 214 from the memory. In this embodiment, the signal 216 instructs the processor to obtain the digitized audio stream 214 to analyze and determine a response based on the keyword recognition at circuitry 208.

Figure 3:
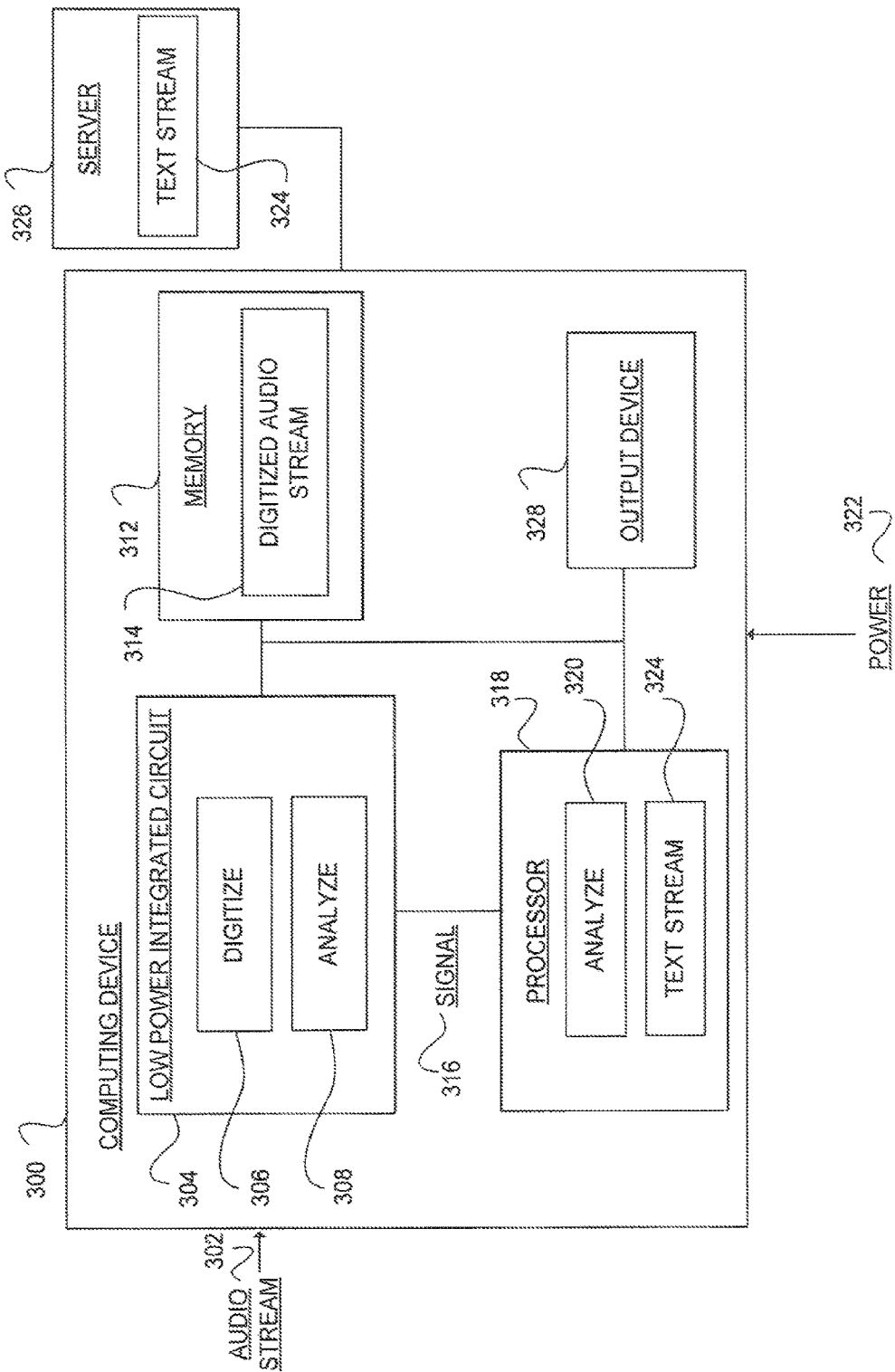
FIG. 3 is a block diagram of an example computing device to analyze a digitized audio stream and a server in communication with the computing device to analyze a text stream generated from the digitized audio stream.

FIG. 3 is a block diagram of an example computing device 300 to analyze a digitized audio stream 314 and a server 326 in communication with the computing device 300 to analyze a text stream 324 generated from the digitized audio stream 314. The computing device 300 includes a low power integrated circuit 304, a memory 312, a processor 318, an output device 328, and the server 326. Specifically, FIG. 3 depicts the text stream 324 processed by the server 326 or the processor 318 to render a response to a user of the computing device on the output device 324. The computing device 300 may be similar in structure and functionality of the computing device 100 as described in connection with FIG. 1.

The audio stream 302 is received by the computing device 300, specifically, the low power integrated circuit 304. The audio stream 302 may be similar in structure to the audio stream 102 and 202 in FIG. 1 and FIG. 2, respectively.

The low power integrated circuit 304 includes a digitize module 306 and an analyze module 308. In one embodiment, the low power integrated circuit 304 includes circuitry to comprise modules 306 and 308. The low power integrated circuit 304 may be similar in structure and functionality of the low power integrated circuit 104 and 204 described in connection with FIG. 1 and FIG. 2, respectively.

The audio stream 302 once received by the computing device 300 is digitized 306 to produce a digitized audio stream 314. The digitize module 306 may be similar in structure and functionality to the digitize module 106 and digitize circuitry 206 in FIG. 1 and FIG. 2, respectively. In a further embodiment, once the audio stream 302 is digitized at module 306, the low power integrated circuit 304 transmits the digitized audio stream 314 to the memory 312 to store and/or maintain.

Once the audio stream 314 is digitized, the low power integrated circuit analyzes the digitized audio stream 314 at module 308. In one embodiment, module 308 compares a keyword to the digitized audio stream 114. In this embodiment, 308 includes the functionality of the compare module 108 as above in FIG. 1.

The memory 312 stores the digitized audio stream 314 from the low power integrated circuit 304. In one embodiment, the memory 312 maintains the digitized audio stream 314 received during a predetermined period of time. For example, the audio stream 302 may be monitored for the predetermined time of a few seconds and as such, this few seconds of the audio stream 302 is digitized at module 306 and sent to the memory 312. In this example, the memory 312 stores the digitized audio stream 314 of the few seconds to be retrieved and/or obtained by the processor 318 to analyze once receiving the signal 316. Also, in this example, when another audio stream 302 of a few seconds is received and digitized, this other digitized audio stream 314 replaces the prior digitized audio stream 314. This allows the memory 312 to maintain the most recent audio stream 302 for the processor 318 to obtain and/or retrieve. The memory 312 may be similar in structure and functionality of the memory 112 as described in connection with FIG. 1.

The audio stream 302 is digitized 306 to produce the digitized audio stream 314. The digitized audio stream 314 is stored and/or maintained in the memory 312. In an embodiment, the processor 318 obtains the digitized audio stream 314 to analyze at module 320 once receiving the signal 316. The digitized audio stream 314 may be similar in structure and functionality of digitized audio stream 114 and 214 as described, in connection with FIG. 1 and FIG. 2, respectively.

The signal 316 is a transmission from the low power integrated circuit 304 to the processor 316 to increase power 322. In an embodiment of the signal 316, additionally instructs the processor 316 to obtain the digitized audio stream 314 to analyze at module 320. The signal 316 may be similar in structure and functionality of the signal 116 and 216 as described in connection with FIG. 1 and FIG. 2, respectively.

The power 322 supplies electrical energy to the processor 318 and/or computing device 300. The power 322 may be similar in structure and functionality of the power 122 as described in connection with FIG. 1.

The processor 318 includes the analyze module 320 and text stream 324. Specifically, the processor 318 receives the signal 316 to increase power 322. Once receiving this signal 316, the processor 318 obtains the digitized audio stream 314 to analyze at module 320. In a further embodiment, the processor 318 converts the digitized audio stream 314 to the text stream 324. In this embodiment, the text within the text stream 324 dictates a response for the computing device 300. The text stream is a string of finite sequence of symbols or representations from an alphabet, numbered set, or alphanumeric set. For example, the digitized audio stream 314 may be in a binary language, thus the processor translates bytes of the binary representation to a word. In a further example, the digitized audio stream 314 may be in a language representative of words and/or numbers, thus the processor 318 translates this language into text the processor 318 comprehends. Embodiments of the response include performing a web search, dialing a phone number, opening an application, recording text, streaming media, composing a text message, listing direction, or speaking directions. In a further embodiment, the processor 318 determines the response to render to a user of the computing device 300. The processor 318 may be similar in structure and functionality of the processor 118 as described in connection with FIG. 1.

The processor 318 analyzes the stored digitized audio stream 314 at module 320. Embodiments of the analyze module 320 include transmitting the digitized audio stream 314 obtained from the memory 314 to the server 326. Other embodiments of module 320 include converting the digitized audio stream 314 obtained from the memory 312 to the text stream 324 and transmitting the text stream 324 to the server 326. Other embodiments of module 320 include converting the digitized audio stream 314 to the text stream 324 to determine the appropriate response by analyzing the context of the audio stream 302. For example, the digitized audio stream 314 may be converted to the text stream 324 at module 320 and the processor 318 may utilize a natural language processing to analyze the text within the text stream 324 to determine the appropriate response based on the context of the audio stream 302.

The text stream 324 includes text to determine the appropriate response for the computing device 300. In one embodiment, the text stream 324 is processed by the processor to determine the appropriate response to render to the user of the computing device 300 on the output device 328. In another embodiment, the text stream 324 is processed by the server 326 to determine the appropriate response which is transmitted to the computing device 300. In this embodiment, the response is sent from the server 326 to the computing device 300. In a further embodiment, the computing device 300 renders the response to the user of the computing device 300. For example, the text stream 324 may include text that discusses sending a text message to mom. Thus, the text within the text stream 324 dictates for the computing device 300 to respond by composing a text message to mom.

The server 326 provides services across a network and may include, for example, a web server, a network server, a Local Area Network (LAN) server, a file server, or any other computing device suitable to process the text stream 324 to transmit the response to the computing device 300.

The output device 328 renders the response as determined from the text within the text stream 324 to the user of the computing device 300. Embodiments of the output device 328 include a display device, a screen, or a speaker to render the response to a user of the computing device 300. In keeping with the text message to mom example, the user of the computing device 300 may have a display that shows the text message being composed to mom and/or speaker to communicate to the user the text message.

Figure 4:
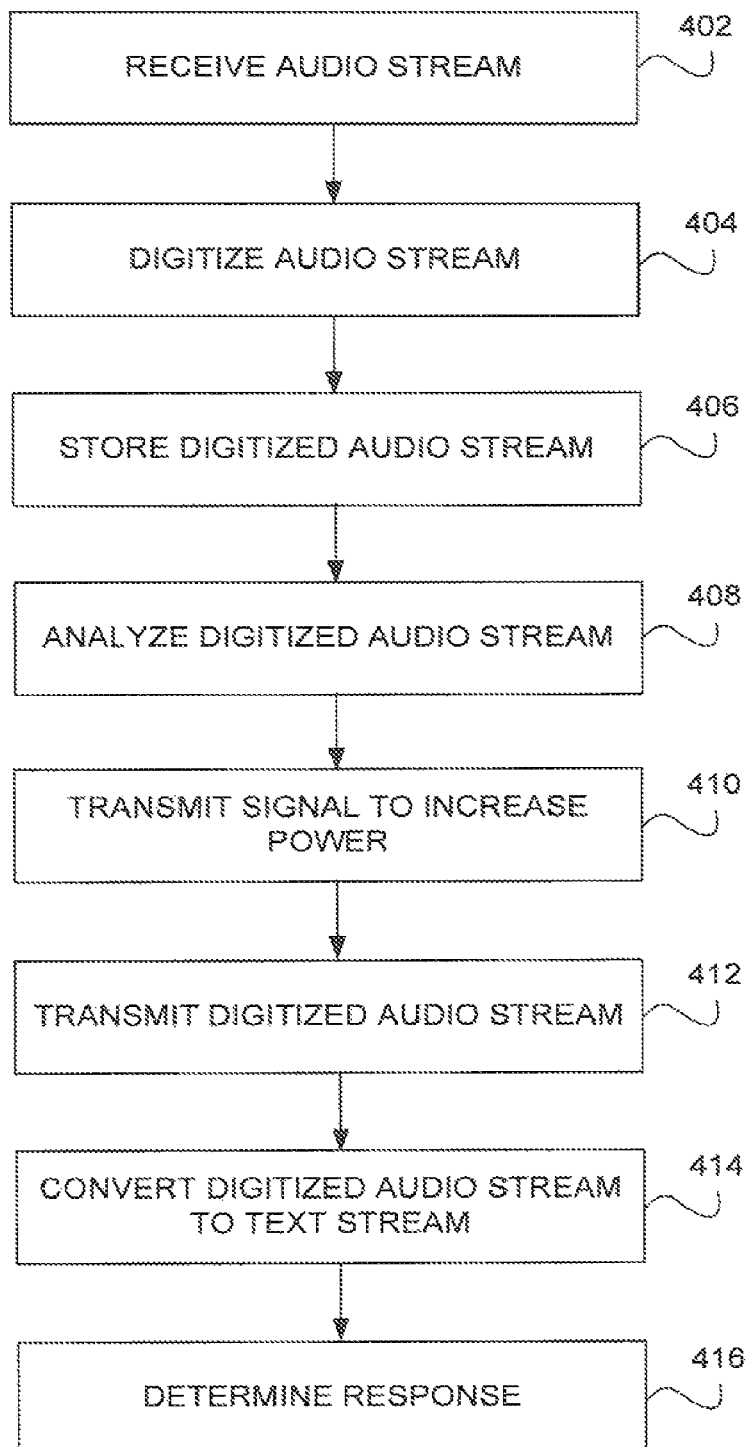
FIG. 4 is a flowchart of an example method performed on a computing device for receiving an audio stream and determining a response.

Turning now to FIG. 4, a flowchart of an example method performed on a computing device to receive an audio stream and determine a response. Although FIG. 4 is described as being performed on computing device 100 as in FIG. 1, it may also be executed on other suitable components as will be apparent to those skilled in the art. For example, FIG. 4 may be implemented in the form of executable instructions on a machine readable storage medium such as memory 112.

At operation 402, the computing device operating in conjunction with a low power integrated circuit receives an audio stream. In one embodiment, the audio stream is of a predetermined amount of time. For example, the audio stream may be a few seconds or milliseconds. In this embodiment, the computing device may continuously monitor audio. In further embodiments, the audio stream includes at least one of a speech from a user or audio from the other computing device.

At operation 404, the low power integrated circuit operating in conjunction with the computing device digitizes the audio stream received at operation 402 to produce a digitized audio stream. Embodiments of operation 404 include the use of an analog to digital converter (ADC), digital conversion device, instruction, firmware, and/or software operating in conjunction with the low power integrated circuit. Embodiments of operation 404 include transmitting the digitized audio stream to a memory. Further embodiments of 404 include compressing the audio stream received at operation 402, while another embodiment of 404 includes compressing the digitized audio stream.

At operation 406, the digitized audio stream produced at operation 404 is stored in the memory. Embodiments of operation 406 include the memory storing and/or maintaining the digitized audio stream. In another embodiment of operation 406, the audio stream received during the predetermined amount of time at operation 402 is digitized at operation 404, thus when another audio stream is received at operation 402 and digitized at operation 404, this current digitized audio stream replaces the prior digitized audio stream. In this embodiment, the memory maintains the stored digitized audio stream received during the predetermined period of time prior to the current time.

At operation 408, the low power integrated circuit analyzes the digitized audio stream produced at operation 404. Embodiments of operation 408 include processing the digitized audio stream while other embodiments include comparing the digitized audio stream to a keyword. In these embodiments of operation 408, the low power integrated circuit processes the digitized audio stream for the keyword. Upon recognition of the keyword within the digitized audio stream, the method moves to operation 410 to transmit a signal. In a further embodiment, if the low power integrated circuit does not recognize the keyword within the digitized audio stream, the method returns to operation 402. Yet, in a further embodiment includes comparing the digitized audio stream to an analog or digital representation that indicates the user of the computing device desires a response by the computing device. In yet a further embodiment, operations 402, 404, 406, and 408 occur in parallel. For example, if the computing device analyzes the digitized audio stream at 408, the integrated circuit continues receiving audio streams at operation 402, digitizing, and storing the audio stream at operations 404 and 406.

At operation 410, the low power integrated circuit transmits the signal to the processor to increase power. Specifically, upon recognition of the keyword within the digitized audio stream, the low power integrated circuit transmits a signal to the processor to increase power. In an embodiment of operation 410, the processor increases power or electrical energy delivered to the processor and/or the computing device.

At operation 412, the processor obtains the stored digitized audio stream from the memory at operation 406. In one embodiment of operation 412, the memory transmits the digitized audio stream to the processor, while in another embodiment of operation 412, the processor retrieves the digitized audio stream from the memory.

At operation 414, the processor converts the digitized audio stream obtained at operation 412 to a text stream. After converting the digitized audio stream to the text stream, the processor analyzes the text within the text stream to determine the appropriate response. Embodiments of operation 414 include using speech to text (STT), voice to text, digital to text, or other type of text conversion. A further embodiment of operation 414 includes using a natural language processing after conversion to the text stream. In this embodiment, the computing device processes the text within the text stream to determine an appropriate response based on the context of the audio stream received at operation 402. For example, once detecting the keyword within the digitized audio stream at 408, the processor obtains at operation 412, and the digitized audio stream is converted to the text stream at operation 414. In a further example, the audio stream may include a conversation regarding directions between two locations, thus once this digitized audio stream is converted at operation 412 to the text stream,—the processor can determine the appropriate response by analyzing the text within the text stream.

At operation 416, the processor determines the response based on the text stream produced at operation 414. Embodiments of the response include performing a web search, dialing a phone number, opening an application, recording text, streaming media, composing a text message, listing directions, or speaking directions. In one embodiment, the text within the text stream dictates the appropriate response for the processor. In a further embodiment, the response is rendered to a user of the computing device. For example, the text stream may include speech inquiring how to reach China and as such directions to China would be the appropriate response. Additionally, in this example, a map display listing and/or speaking directions to China may be included.

Figure 5:
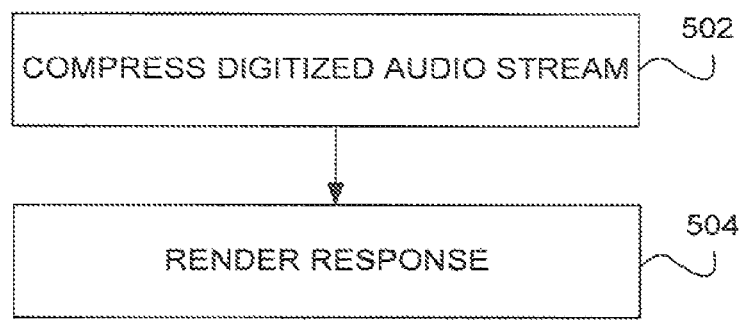
FIG. 5 is a flowchart of an example method performed on a computing device to compress a digitized audio stream and render a response.

Referring now to FIG. 5, a flowchart of an example method performed on a computing device to compress a digitized audio stream and render a response to a user of the computing device. Although FIG. 5 is described as being performed on computing device 300 as above in FIG. 3, it may also be executed on other suitable components as will be apparent to those skilled in the art. For example, FIG. 5 may be implemented in the form of executable instructions on a machine readable storage medium such as memory 312.

At operation 502, the computing device compresses a digitized audio stream. In one embodiment, operation 502 is performed in conjunction with operation 404 prior to operation 406 in FIG. 4. For example, once having digitized the received audio stream, a low power integrated circuit operation in conjunction with the computing device may compress the digitized audio stream to reduce the data byte size of the stream. In this example, the compression of the digitized audio stream occurs prior to being stored in a memory at operation 406. In a further embodiment, operation 502 is performed prior to receiving the digitized audio stream at operation 412 in FIG. 4. For example, the processor may perform operation 502 to compress the digitized audio stream from the memory while in another example, the memory may compress the digitized audio stream prior to the processor obtaining the digitized audio stream. In yet a further embodiment of operation 502, the compressed digitized audio stream is analyzed to recognize a keyword such as at step 408 in FIG. 4.

At operation 504, the computing device renders a response to the user of the computing device. Embodiments of operation 504 include occurring during or after operation 416 in FIG. 4. For example, once the processor determines the appropriate response, this response may be rendered to the user of the computing device. In a further embodiment, the response may be rendered to the user on an output device, such as a display screen or speaker, operating in conjunction with the computing device. For example, when the user discusses the difference between a shrimp and prawn, the processor may launch a web search application, thus performing the web search of difference between the shrimp and prawn. The performed web search may be rendered on the display device of the computing device to the user. In a further example, the computing device audibly recites the differences between the shrimp and prawn through a speaker to the user. In these embodiments, the computing device operates with an audio stream to determine a response rather than the user instructing the computing device.

The embodiments described in detail herein relate to digitizing an audio stream to detect a keyword and based upon recognition of the keyword within the digitized audio stream, transmitting a signal to a processor to increase power and further analyze the digitized audio stream to determine a response. In this manner, example embodiments save a user time by preventing repetitive audio instructions to a computing device, while reducing power consumption of the computing device.

What is claimed is:

1. A method for processing audio information, comprising:
   receiving, by a computing device, an audio stream, the audio stream including a keyword and additional audio;
   monitoring, by a low power integrated circuit of the computing device, the audio stream;
   digitizing, by the low power integrated circuit, the audio stream, the digitized audio stream including the keyword and the additional audio;
   storing the digitized audio stream in a memory in the computing device, wherein storing the digitized audio stream comprises replacing a prior digitized audio stream stored in the memory with the digitized audio stream;
   analyzing, by the low power integrated circuit, the stored digitized audio stream for recognition of the keyword;
   upon recognition of the keyword within the stored digitized audio stream, inducing, by the low power integrated circuit, a processor of the computing device to enter an increased power usage state and to obtain at least the additional audio of the stored digitized audio stream from the memory;
   obtaining, by the processor, at least the additional audio of the stored digitized audio stream from the memory;
   transmitting, by the computing device, at least the additional audio of the stored digitized audio stream to a server for determining one or more actions based on at least the additional audio of the stored digitized audio stream; and
   rendering, by the computing device, a response received from the server, wherein the response is based on analysis of at least the additional audio of the digitized audio stream and comprises one or more instructions to perform the one or more actions.

2. The method of claim 1, wherein the stored digitized audio stream is converted to a text stream.

3. The method of claim 1, wherein the one or more instructions comprise at least one of performing a web search, dialing a phone number, opening an application, recording text, streaming media, composing a text message, listing directions, or speaking directions.

4. The method of claim 1, wherein the audio stream includes at least one of speech from a user, speech from another computing device, or audio from the another computing device.

5. The method of claim 1, further comprising compressing the digitized audio stream prior to storage in the memory.

6. The method of claim 1, further comprising in response to recognizing the keyword within the stored digitized audio stream:
   continuously receiving the audio stream;
   continuously monitoring the audio stream; and
   continuously digitizing the audio stream.

7. The method of claim 1, further comprising outputting the rendered response by at least one of a display of the computing device or a speaker of the computing device.

8. The method of claim 1, wherein receiving the audio stream comprises receiving the audio stream from a user by a microphone of the computing device.

9. A computing device for processing audio information, comprising:
   a low power integrated circuit;
   a memory coupled to the low power integrated circuit;
   a processor coupled to the low power integrated circuit and the memory;
   wherein the low power integrated circuit is configured to:
     monitor and digitize an audio stream received by the computing device, the digitized audio stream including a keyword and additional audio;
     store the digitized audio stream in the memory, wherein storing the digitized audio stream comprises replacing a prior digitized audio stream stored in the memory with the digitized audio stream;
     analyze the stored digitized audio stream to recognize the keyword;
     upon recognition of the keyword in the stored digitized audio stream, induce the processor of the computing device to enter an increased power usage state and to obtain at least the additional audio of the stored digitized audio stream from the memory; and
   wherein the processor is configured to:
     obtain at least the additional audio of the stored digitized audio stream from the memory;
     transmit at least the additional audio of the stored digitized audio stream to a server for determining one or more actions based on at least the additional audio of the stored digitized audio stream; and
     render a response received by the computing device from a server, wherein the response is based on analysis of at least the additional audio of the digitized audio stream.

10. The computing device of claim 9, wherein the stored digitized audio stream is converted to a text stream.

11. The computing device of claim 9, wherein the response received from the server comprises one or more instructions to perform the one or more actions by the processor.

12. The computing device of claim 11, wherein the one or more instructions comprise at least one of performing, by the processor, a web search, dialing a phone number, opening an application, recording text, streaming media, composing a text message, listing directions, or speaking directions.

13. The computing device of claim 9, wherein the audio stream includes at least one of speech from a user, speech from another computing device, or audio from the another computing device.

14. The computing device of claim 9, wherein the digitized audio stream is compressed prior to storage in the memory.

15. The computing device of claim 9, wherein the low power integrated circuit is further configured to, in response to recognizing the keyword within the stored digitized audio stream:
  continuously receive the audio stream;
  continuously monitor the audio stream; and
  continuously digitize the audio stream.

16. The computing device of claim 9, further comprising at least one of:
  a display configured to output the rendered response; or
  a speaker configured to output the rendered response.

17. The computing device of claim 9, wherein the received audio stream is received by a microphone of the computing device.

18. The computing device of claim 9, wherein the processor is further configured to:
  transmit the keyword and the additional audio of the stored digitized audio stream to the server for determining the one or more actions.

19. A system for analyzing a digitized audio stream, comprising:
  a computing device, comprising:
    one or more processors;
    a memory; and
    a low power integrated circuit coupled to the one or more processors and the memory, the low power integrated circuit configured to:
    monitor and digitize an audio stream received by the computing device, the digitized audio stream including a keyword and additional audio;
    store the digitized audio stream in the memory;
    analyze the stored digitized audio stream to recognize the keyword;
    upon recognition of the keyword in the stored digitized audio stream, induce the one or more processors to enter an increased power usage state; and
  a server configured to:
    receive at least the additional audio of the digitized audio stream transmitted from the computing device;
    process at least the additional audio of the received digitized audio stream to determine one or more actions; and
    transmit an instruction to perform the one or more actions to the computing device, wherein the instruction is based on analysis of at least the additional audio of the received digitized audio stream.

20. The system of claim 19, wherein the one or more processors are further configured to perform the one or more actions based at least in part on the instruction received from the server.

21. The system of claim 20, wherein the one or more actions comprise at least one of performing a web search, dialing a phone number, opening an application, recording text, streaming media, composing a text message, listing directions, or speaking directions.

22. The system of claim 19, wherein the one or more processors are further configured to transmit at least the additional audio of the digitized audio stream to the server.

23. The system of claim 22, wherein the one or more processors are further configured to compress the digitized audio stream.

24. The system of claim 19, wherein the received audio stream is received by a microphone of the computing device.

25. The system of claim 19, wherein the lower power integrated circuit is further configured to replace a prior digitized audio stream stored in the memory with the digitized audio stream.

26. The system of claim 19, wherein the computing device further comprises at least one of:
  a display configured to output the rendered response; or
  a speaker configured to output the rendered response.

27. The system of claim 19, wherein to process the received digitized audio stream the server is further configured to:
  convert the received digitized audio stream to a text stream; and
  analyze the text stream to determine a meaning of the text stream.

* * * * *